(12) United States Patent
Kanai et al.

(10) Patent No.: US 12,741,537 B2
(45) Date of Patent: Sep. 22, 2026

(54) ELECTRIC WORK MACHINE

(71) Applicant: Yanmar Holdings Co., Ltd., Osaka (JP)

(72) Inventors: Daiki Kanai, Fukuoka (JP); Hiroyuki Muraoka, Fukuoka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 213 days.

(21) Appl. No.: 18/803,895

(22) Filed: Aug. 14, 2024

(65) Prior Publication Data

US 2025/0091442 A1 Mar. 20, 2025

(51) Int. Cl.

| | |
|---|---|
| ***B60L 1/00*** | (2006.01) |
| ***B60L 15/00*** | (2006.01) |
| ***E02F 9/08*** | (2006.01) |
| ***E02F 9/22*** | (2006.01) |

(52) U.S. Cl.
CPC ............... *B60L 1/00* (2013.01); *B60L 15/007* (2013.01); *E02F 9/0866* (2013.01); *B60L 2200/40* (2013.01); *E02F 9/2203* (2013.01); *E02F 9/2292* (2013.01); *E02F 9/2296* (2013.01)

(58) Field of Classification Search
CPC ...... B60L 1/00; B60L 15/007; B60L 2200/40; E02F 9/0866; E02F 9/2203; E02F 9/2292; E02F 9/2296
See application file for complete search history.

(56) References Cited

U.S. PATENT DOCUMENTS

| | | | | |
|---|---|---|---|---|
| 12,157,360 | B2 * | 12/2024 | Tottori | B60K 11/02 |
| 12,473,713 | B2 * | 11/2025 | Muraoka | E02F 9/0858 |
| 12,618,224 | B2 * | 5/2026 | Muraoka | E02F 9/0866 |
| 2023/0227106 | A1 * | 7/2023 | Takaki | B62D 21/02 180/65.1 |
| 2024/0133156 | A1 * | 4/2024 | Muraoka | E02F 9/0866 |
| 2025/0091442 | A1 * | 3/2025 | Kanai | B60L 1/00 |
| 2025/0092638 | A1 * | 3/2025 | Kanai | E02F 9/0866 |
| 2025/0125442 | A1 * | 4/2025 | Nadiadi | H01M 10/625 |
| 2025/0135923 | A1 * | 5/2025 | Nadiadi | B62D 25/12 |
| 2025/0140959 | A1 * | 5/2025 | Anattasakul | B60K 1/04 |
| 2025/0289332 | A1 * | 9/2025 | Kanai | B60L 53/16 |
| 2025/0290283 | A1 * | 9/2025 | Muraoka | E02F 9/2004 |

FOREIGN PATENT DOCUMENTS

JP 2002167181 A * 6/2002

* cited by examiner

*Primary Examiner* — Jacob B Meyer
(74) *Attorney, Agent, or Firm* — Chris Mizumoto

(57) ABSTRACT

A hydraulic excavator as the electric work machine comprises: a body frame located in a bottom part of a body; a hood support part vertically provided in the body frame; a battery unit for charging power; an electric motor driven by the power which is supplied from the battery unit; and electrical parts electrically connected to the battery unit. The electrical parts include a first electrical device which is attached, opposite to a side surface of the battery unit, to the hood support part.

9 Claims, 9 Drawing Sheets

1
HYDRAULIC ACTUATOR
63
HEAT EXCHANGER
64
CONTROL VALVE
62
HYDRAULIC OIL TANK
65
HYDRAULIC PUMP
61
ELECTRIC MOTOR
EM
SYSTEM CONTROLLER
57,E2,EP
INVERTER
52,EP
51,E1,EP
54,E3,EP
JUNCTION BOX
55,E4,EP
CHARGER
DC-DC CONVERTER
CONTROLLING VOLTAGE (12V)
53,EP
PDU
BATTERY UNIT
BU
LOW-VOLTAGE BATTERY
56,EP

ELECTRIC WORK MACHINE

CROSS-REFERENCE

This application claims foreign priority of JP2023-149542 filed Sep. 14, 2023, the disclosures of which are hereby incorporated by reference in its entirety.

TECHNICAL FIELD

The present invention relates to an electric work machine.

BACKGROUND ART

In Patent Document 1, disclosed is an electric work machine whose driving source is an electric motor and which has a support frame and a vertically provided frame. The support frame is vertically provided in a revolving substrate and supports an exterior cover. The vertically provided frame is attached to a battery unit and supports electrical parts (an inverter, a junction box, a converter) above the battery unit.

PRIOR ART DOCUMENT

Patent Document

Patent Document 1: Japanese Patent Laid-Open No. 2021-80704

SUMMARY OF INVENTION

Technical Problem

However, in the structure of Patent Document 1, since the electrical parts and the battery unit are located one on top of the other in the up-down direction, its body tends to be high in the up-down direction. When the height of the body is increased, the stability of the body may be reduced, and the operability may also be compromised due to its elevated driver seat.

In addition, in the structure that the electrical parts and the battery unit are located one on top of the other in the up-down direction, when one attempts to suppress an increase in the height of the body, he/she must install a small battery unit in the body, which makes an increase in the battery capacity difficult.

Moreover, because the vertically provided frame which supports the electrical parts is attached to the battery unit, stress resulting from the electrical parts (gravity of the electrical parts, for example) acts on the battery unit via the vertically provided frame. As a result, the breakage of the battery unit may be caused.

The present invention has been made to solve the above problem, and its object is to provide an electric work machine which ensures the durability of the battery unit while an increase in the height of the body is suppressed, and which allows the installation of a large battery unit so that the battery capacity can be increased.

Solution to Problem

An electric work machine according to an aspect of the present invention comprises: a body frame located in a bottom part of a body; a hood support part vertically provided in the body frame; a battery unit for charging power; an electric motor which is driven by the power supplied from the battery unit; and electrical parts electrically connected to the battery unit, wherein the electrical parts include a first electrical device which is attached, opposite to a side surface of the battery unit, to the hood support part.

Advantageous Effects of Invention

According to the above structure, while the durability of the battery unit is ensured, an increase in the height of the body is suppressed, and the installation of the large battery unit is allowed so that the battery capacity can be increased.

BRIEF DESCRIPTION OF DRAWINGS

FIG. 3 is a perspective view from the front left illustrating the internal structure of an engine room provided in an upper structure of the hydraulic excavator.

FIG. 4 is a perspective view from the rear left illustrating the internal structure of the engine room.

FIG. 6 is a left side view illustrating the arrangement of devices in the engine room.

FIG. 7 is a front view illustrating the arrangement of the devices.

DESCRIPTION OF EMBODIMENTS

An embodiment of the present invention will be described below based on the drawings.

[1. Schematic Structure of an Electric Work Machine]

Figure 1:
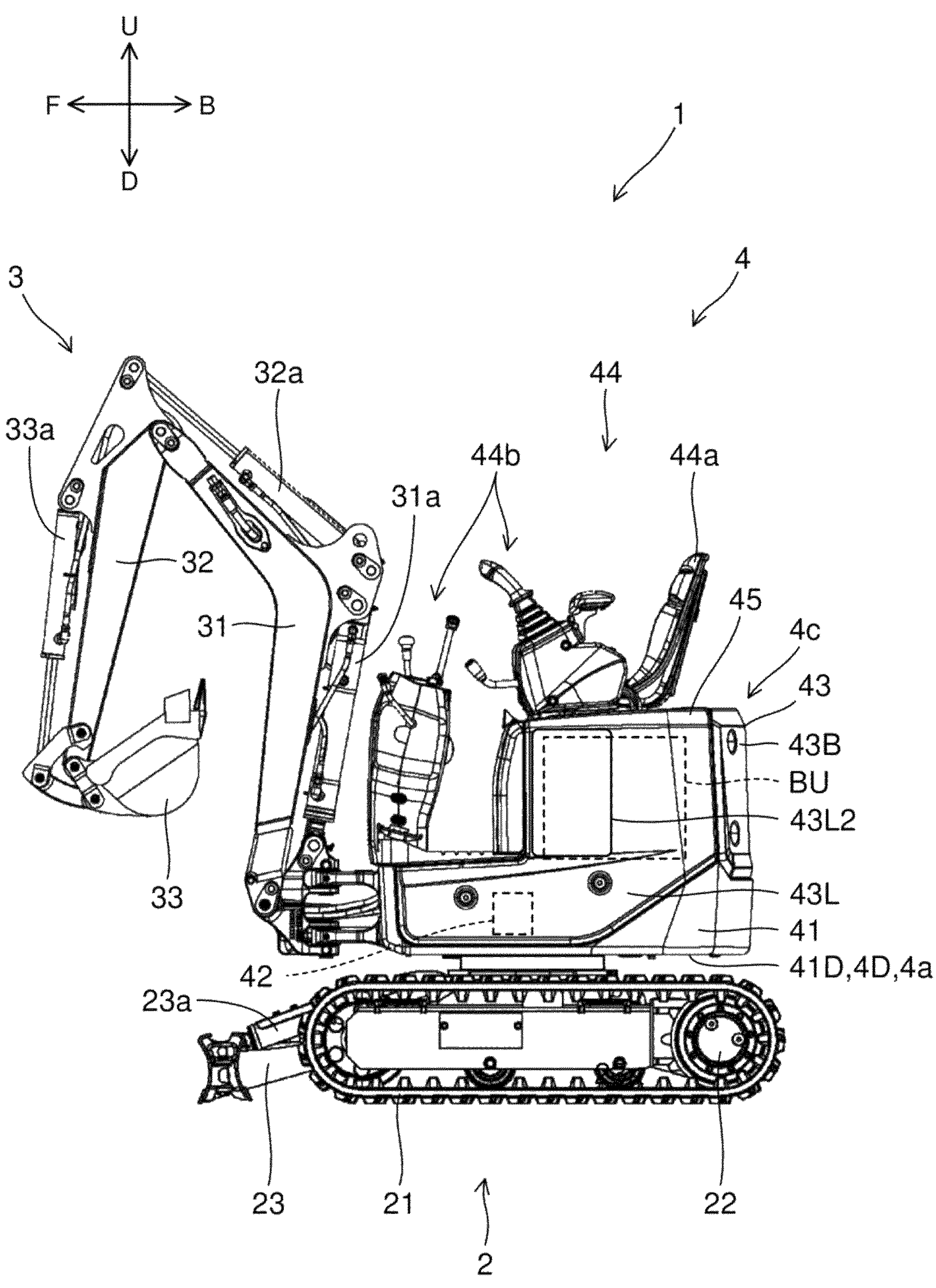
FIG. 1 is a left side view of a schematic structure of a hydraulic excavator as an example of an electric work machine according to an embodiment of the present invention.

FIG. 1 is a left side view of a schematic structure of a hydraulic excavator 1 (an electric excavator) as an example of an electric work machine according to an embodiment of the present invention. The hydraulic excavator 1 comprises an undercarriage 2, a work machine 3, and an upper structure 4 (also referred to as a body).

Here, directions are defined as follows. A direction where an operator (manipulator, driver) seated on a driver seat **44*a* arranged in an operation part 44 of the upper structure 4 faces forward is defined as the "front", and the opposite direction is defined as the "back". In a state where the upper structure 4 is not revolved with respect to the undercarriage 2 (a revolving angle of 0°), the front-back direction of the upper structure 4 coincides with the front-back direction of the undercarriage 2. In the drawings, the hydraulic excavator 1 is illustrated in a state where the upper structure 4 is not revolved with respect to the undercarriage 2. In addition, the left side viewed from the operator seated on the driver seat 44*a*** is defined as the "left" and the right side is defined as the "right". Furthermore, the gravity direction perpendicular to the front-back direction and the left-right direction (also referred to as the width direction) is defined as the up-down direction, the upstream side in the gravity direction is defined as the "up", and the downstream side is defined as the "down". In the drawings, the front is indicated by a symbol "F", the rear is indicated by a symbol "B", the left is indicated by a symbol "L", the right is indicated by a symbol "R", the up is indicated by a symbol "U", and the down is indicated by a symbol "D", as necessary.

The undercarriage 2 comprises a pair of left and right crawlers 21, a pair of left and right travel motors 22 and a blade 23. When the left and right travel motors 22 respectively drive the left and right crawlers 21, the hydraulic excavator 1 can be moved forward and backward. The travel motors 22 are composed of hydraulic motors. The blade 23 for performing ground leveling work is provided forward of the undercarriage 2. The blade 23 is rotated by a blade cylinder 23*a*. The blade cylinder 23*a* is composed of a hydraulic cylinder.

The work machine 3 comprises a boom 31, an arm 32, and a bucket 33. When the boom 31, the arm 32, and the bucket 33 are independently driven, excavation work of soil, sand, etc., can be carried out.

The boom 31 is rotated by a boom cylinder 31*a*. The base end of the boom cylinder 31*a* is supported by the front part of the upper structure 4 so as to be movable in a freely extended and contracted manner. In the drawings, the boom cylinder 31*a* is arranged so that its rod side is defined as the base end; however, the boom cylinder 31*a* may be arranged so that its tube side is defined as the base end. The arm 32 is rotated by an arm cylinder 32*a*.

The base end of the arm cylinder 32*a* is supported by the boom 31 to be movable in a freely extended and contracted manner. The bucket 33 is rotated by a bucket cylinder 33*a*. The base end of the bucket cylinder 33*a* is supported by the arm 32 to be movable in a freely extended and contracted manner. The boom cylinder 31*a*, the arm cylinder 32*a*, and the bucket cylinder 33*a* are respectively composed of hydraulic cylinders.

The upper structure 4 is located above the undercarriage 2 and is revolvably provided with respect to the undercarriage 2 via a revolving bearing (not shown). The upper structure 4 comprises a body frame 41 (also referred to as a revolving frame), a revolving motor 42, an engine room 43 and an operation part 44. The upper structure 4 is revolved with respect to the undercarriage 2 by driving the revolving motor 42 arranged in the body frame 41. The revolving motor 42 is composed of a hydraulic motor.

The body frame 41 is provided in the lower part of the upper structure 4. The body frame 41 is composed of a cast member which extends horizontally; however, it is not limited thereto, and it may be a structure including a plurality of metal members which are bonded by welding and the like, for example. An undersurface 41D of the body frame 41 is included in a bottom surface part 4D of the upper structure 4. In the upper structure 4, a portion including the bottom surface part 4D is referred to as a bottom part 4*a* of the upper structure 4. Therefore, the body frame 41 is located in the bottom part 4*a* of the upper structure 4.

In the engine room 43, a rear hood member 43B, a left hood member 43L, a right hood member (not shown) and an upper wall part 45 are provided. The rear hood member 43B constitutes a side wall of the rear side in the engine room 43. The rear hood member 43B is composed of a metallic plate-like member.

The left hood member 43L and the right hood member described above constitute left and right side walls of the engine room 43. The left hood member 43L is fixed to the body frame 41 and a rear hood support part 103 (see FIG. 4) which is described later. The right hood member is also fixed to the body frame 41 and the rear hood support part 103. The left hood member 43L and the right hood member are fixed to the body frame 41 via a support member (not shown). The left hood member 43L and the right hood member are composed of metallic plate-like members.

The upper wall part 45 constitutes the upper side wall of the engine room 43. The upper wall part 45 is composed of a metallic plate-like member. The upper wall part 45 is coupled to a front hood support part 102 (see FIG. 3) described later and the rear hood support part 103 (see FIG. 4).

The rear hood member 43B, the left hood member 43L, the right hood member and the upper wall part 45 constitute an exterior part 4*c* of the upper structure 4. The body frame 41 is also included in the exterior part 4*c*. The outer peripheral surface of the upper structure 4 is constituted by the exterior part 4*c*. In the upper structure 4, an inner portion partitioned by the exterior part 4*c* is referred to as an inner part 4*e* of the upper structure 4 (see FIG. 3). In the inner part 4*e* of the upper structure 4, spaces inside the engine room 43 is included. With respect to the exterior part 4*c*, a side opposite to the inner part 4*e* of the upper structure 4 (in other words, an outer portion partitioned by the exterior part 4*c*) is referred to as an outer part of the upper structure 4 (not shown).

In the engine room 43, a battery unit BU (also referred to as a high-voltage battery) and a hydraulic pump 61 (see FIG. 2) are contained. Namely, the hydraulic excavator 1 comprises the battery unit BU and the hydraulic pump 61 in the inner part 4*e* of the upper structure 4. The battery unit BU is composed of a lithium-ion battery, for example, and stores power for driving an electric motor EM (see FIG. 2). The battery unit BU may be composed of a plurality of batteries as a unit, or may be composed of a single battery cell. Further, a feeding port (not illustrated) is provided in the upper structure 4. By connecting the feeding port to an external power supply (not shown), the battery unit BU can be charged.

The hydraulic pump 61 is driven by the electric motor EM to eject hydraulic oil. The hydraulic oil (pressure oil) is supplied to hydraulic motors (for example, the left and right travel motors 22, the revolving motor 42), and hydraulic cylinders (for example, a blade cylinder 23*a*, a boom cylinder 31*a*, an arm cylinder 32*a*, a bucket cylinder 33*a*). The hydraulic motors and the hydraulic cylinders which are driven by hydraulic oil being supplied from the hydraulic pump 61 are collectively called a hydraulic actuator 63 (see FIG. 2).

The operation part 44 is provided above the upper structure 4. The driver seat 44*a* is arranged in the operation part 44. The driver seat 44*a* is fixed to the top surface part of the upper wall part 45. A plurality of operation members 44*b* are arranged around the driver seat 44*a*. The plurality of operation members 44*b* are structured with levers, switches, pedals and the like. When the operator is seated on the driver seat 44*a* and operates the plurality of operation members 44*b*, the hydraulic actuators 63 is driven. This allows traveling the undercarriage 2, ground leveling work by the blade 23, excavation work by the work machine 3, revolving the upper structure 4 and the like to be performed.

The hydraulic excavator 1 may have a structure that the hydraulic actuator 63 and an electric actuator driven by electric power are concurrently used as actuators. Further, the electric excavator 1 may have a structure that solely comprises the electric actuator as an actuator. The electric actuator includes an electric travel motor, an electric revolving motor and an electric cylinder, for example.

[2. Structure of an Electric System and a Hydraulic System]

Figure 2:
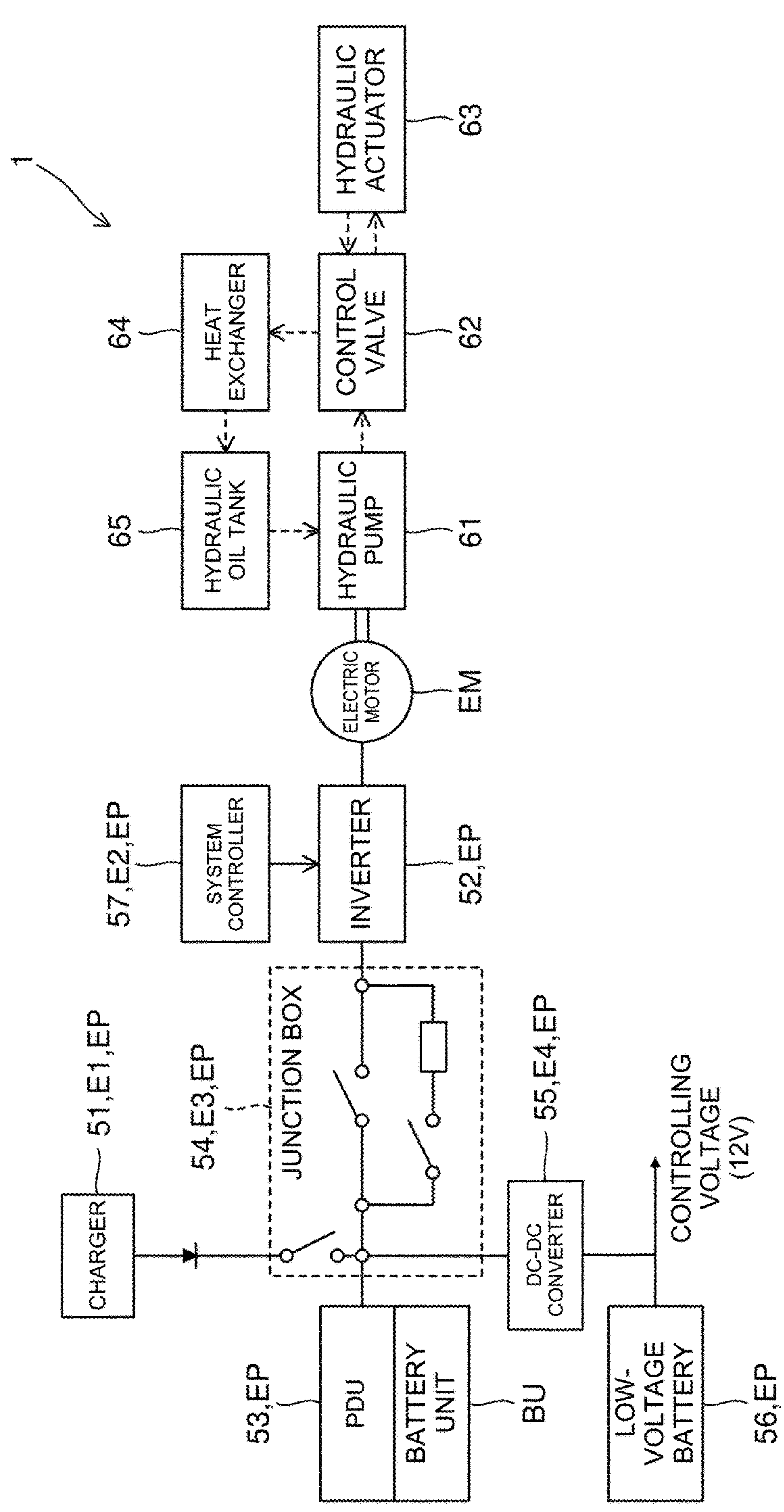
FIG. 2 is a block diagram schematically illustrating a structure of an electrical system and a hydraulic system of the hydraulic excavator.

FIG. 2 is a block diagram schematically illustrating the structure of an electrical system and a hydraulic system of the hydraulic excavator 1. Meanwhile, in FIG. 2, wiring through which an electric signal or current flows is indicated by a solid line, and an oil passage through which hydraulic oil flows is indicated by a dashed line.

The hydraulic excavator 1 comprises the electric motor EM, a charger 51, an inverter 52, a PDU (a power drive unit) 53, a junction box 54, a DC-DC converter 55, a low-voltage battery 56 and a system controller 57. The charger 51, the inverter 52, the PDU 53, the junction box 54, the DC-DC converter 55, the low-voltage battery 56 and the system controller 57 are collectively called electrical parts EP. The electrical parts EP are contained in the engine room 43 (see FIG. 3 and FIG. 4). Namely, the hydraulic excavator 1 comprises the electrical parts EP in the inner part 4*e* of the upper structure 4.

Moreover, the electrical parts EP include a first electrical device E1, a second electrical device E2, a third electrical device E3, and a fourth electrical device E4. In particular, the first electrical device E1, the second electrical device E2, the third electrical device E3 and the fourth electrical device E4 are respectively structured with a part of the electrical parts EP. For example, the first electrical device E1 includes the charger 51. The second electrical device E2 includes the system controller 57. The third electrical device E3 includes the junction box 54. The fourth electrical device E4 includes the DC-DC converter 55.

The electrical parts EP are electrically connected to the battery unit BU. That is to say, respective devices included in the electrical parts EP are directly connected to the battery unit BU or electrically connected to the battery unit BU via other devices included in the electrical parts EP. For example, the PDU 53 included in the electrical parts EP is directly connected to the battery unit BU. Furthermore, the inverter 52 included in the electrical parts EP is electrically connected to the battery unit BU via the junction box 54 as another electrical device included in the electrical parts EP.

The electric motor EM is driven by electric power supplied from the battery unit BU via the junction box 54 and the inverter 52. The electric motor EM is composed of a synchronous motor, an induction motor or the like. The electric motor EM is contained in the engine room 43 (see FIG. 4). That is to say, the hydraulic excavator 1 comprises the electric motor EM in the inner part 4*e* of the upper structure 4.

The charger 51 (also referred to as a feeder) converts an AC voltage supplied from the external power supply into a DC voltage. The inverter 52 converts a DC voltage supplied from the battery unit BU into an AC voltage and supplies the AC voltage to the electric motor EM. Thus, the electric motor EM is driven. A supply of the AC voltage from the inverter 52 to the electric motor EM is performed based on a drive command which is outputted from the system controller 57.

The PDU 53 is a battery control unit that controls an internal battery relay to control input and output of the battery unit BU. The junction box 54 is structured with a charger relay, an inverter relay, a fuse and the like. A voltage outputted from the charger 51 is supplied to the battery unit BU via the junction box 54 and the PDU 53. Furthermore, a voltage outputted from the battery unit BU is supplied to the inverter 52 via the PDU 53 and the junction box 54.

The DC-DC converter 55 (also simply referred to as a converter) downconverts a high DC voltage (e.g., 48 V) supplied from the battery unit BU via the junction box 54 to a low voltage (e.g., 12 V). The low-voltage battery 56 is composed of a lead battery, for example. The low-voltage battery 56 is connected to the DC-DC converter 55 and stores electric power which is downconverted and outputted by the DC-DC converter 55. Therefore, the low-voltage battery 56 outputs a voltage lower than that of the battery unit BU.

Low DC voltages outputted from the DC-DC converter 55 and the low-voltage battery 56 are supplied to the system controller 57, a drive part of a fan 71 described later (see FIG. 3) and the like. The system controller 57 is composed of an electronic control unit also referred to as an ECU (an Electric Control Unit). The system controller 57 performs electric control over respective parts of the hydraulic excavator 1.

The plurality of hydraulic pumps 61 are connected to a rotating shaft (an output shaft) of the electric motor EM. The plurality of hydraulic pumps 61 include a variable displacement pump and a fixed displacement pump. In FIG. 2, only one hydraulic pump 61 is illustrated as an example. Each of the hydraulic pumps 61 is connected to a hydraulic oil tank 65 that stores hydraulic oil. When the hydraulic pumps 61 are driven by the electric motor EM, hydraulic oil in the hydraulic oil tank 65 is supplied to the hydraulic actuator 63 via a control valve 62. Thus, the hydraulic actuator 63 is driven. The control valve 62 is a direction-switching valve that controls the flow direction and the flow rate of hydraulic oil supplied to the hydraulic actuator 63.

In the oil passage to which the control valve 62 and the hydraulic oil tank 65 are connected, a heat exchanger 64 (also referred to as an oil cooler) is provided. Hydraulic oil which has heat generated with the hydraulic actuator 63 being driven flows into the heat exchanger 64 via the control valve 62. The heat exchanger 64 exchanges heat with air (wind) hitting against the heat exchanger 64 to cool hydraulic oil. In a word, the heat exchanger 64 cools hydraulic oil which is ejected from the hydraulic pumps 61 and has heat generated due to the hydraulic actuator 63 being driven.

[3. Internal Structure of the Engine Room]

Figure 3:
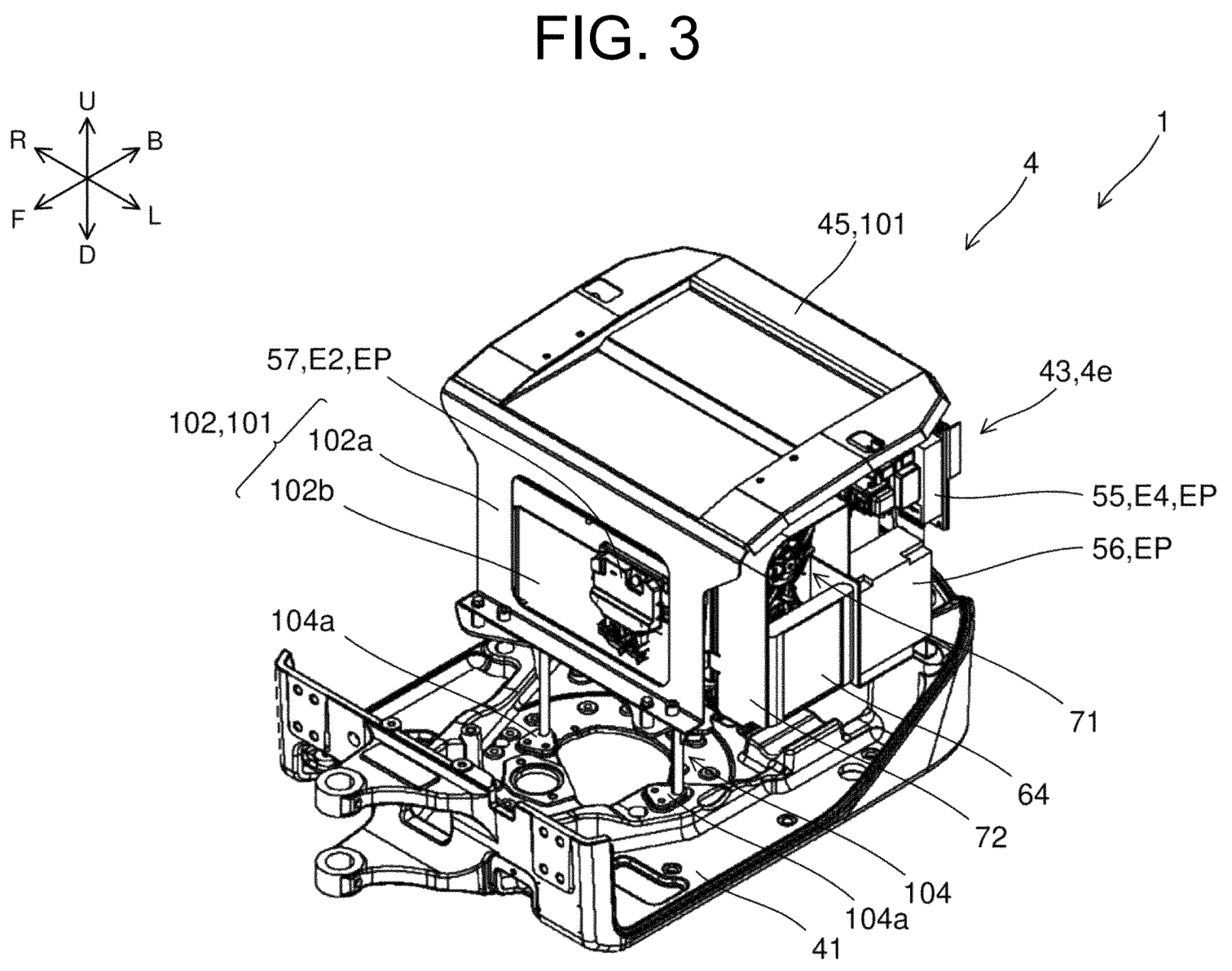
Figure 4:
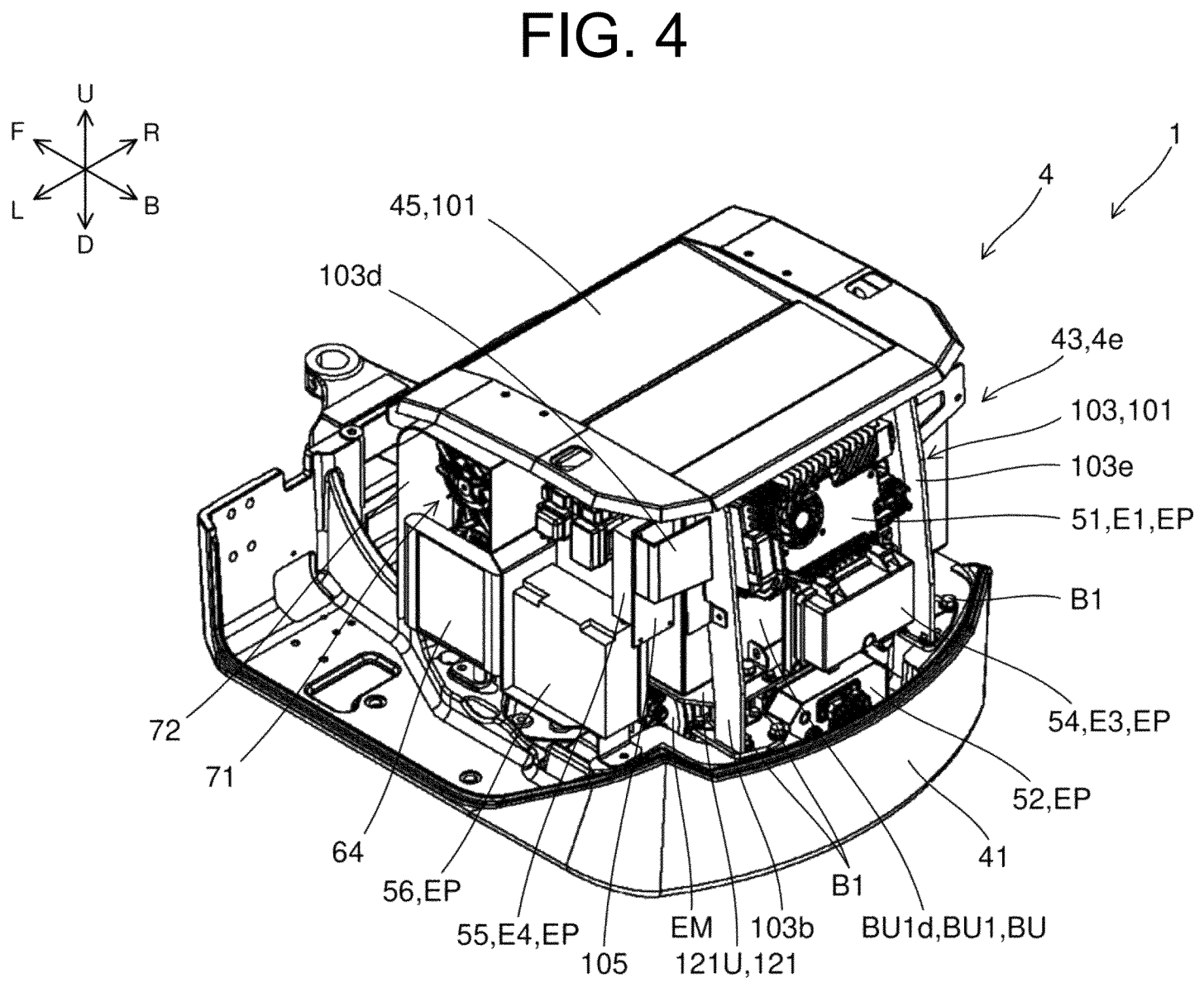

FIG. 3 and FIG. 4 are a perspective view from the front left and a perspective view from the rear left illustrating the internal structure of the engine room 43. The engine room 43 has a hood support part 101. That is, the hydraulic excavator 1 comprises the hood support part 101. The hood support part 101 supports the rear hood member 43B (see FIG. 1), the left hood member 43L (see FIG. 1) and the right hood member described above. The hood support part 101 is structured with an upper wall part 45, a front hood support part 102 and a rear hood support part 103.

As shown in FIG. 3, the front hood support part 102 is arranged forward of the engine room 43.

The front hood support part 102 has a vertical plate 102*a* and an attachment plate 102*b*. The vertical plate 102*a* is composed of a metallic plate-like member which extends in the up-down direction, whose upper end part is bent obliquely rearward, and whose lower end part is bent forward. The upper end part of the vertical plate 102*a* is bonded to the front end part of the upper wall part 45 by welding. The lower end part of the vertical plate 102*a* is coupled to a support column part 104 by fastening members such as bolts.

The support column part 104 is a support member whose lower end part 104*a* is coupled to the body frame 41.

Therefore, the vertical plate 102*a* is vertically provided with respect to the body frame 41 via the support column part 104.

The attachment plate 102*b* is composed of a metallic plate-like member which extends in the left-right direction and whose respective left and right end parts are bent forward. Respective bent end parts are coupled to the rear surface part of the vertical plate 102*a*. In the attachment plate 102*b*, a plurality of attachment holes penetrating in the front-back direction are provided (not shown). The second electrical device E2 (the system controller 57) is arranged in front of the attachment plate 102*b*. The second electrical device E2 is fixed to the above attachment holes by fastening members such as bolts. Thus, the second electrical device E2 is attached to the hood support part 101 (the front hood support part 102, in particular). Meanwhile, in the vertical plate 102*a*, a through-hole penetrating in the front-back direction (not shown) is provided in a position corresponding to the second electrical device E2.

As shown in FIG. 4, the rear hood support part 103 is arranged rearward of the engine room 43.

Figure 5:
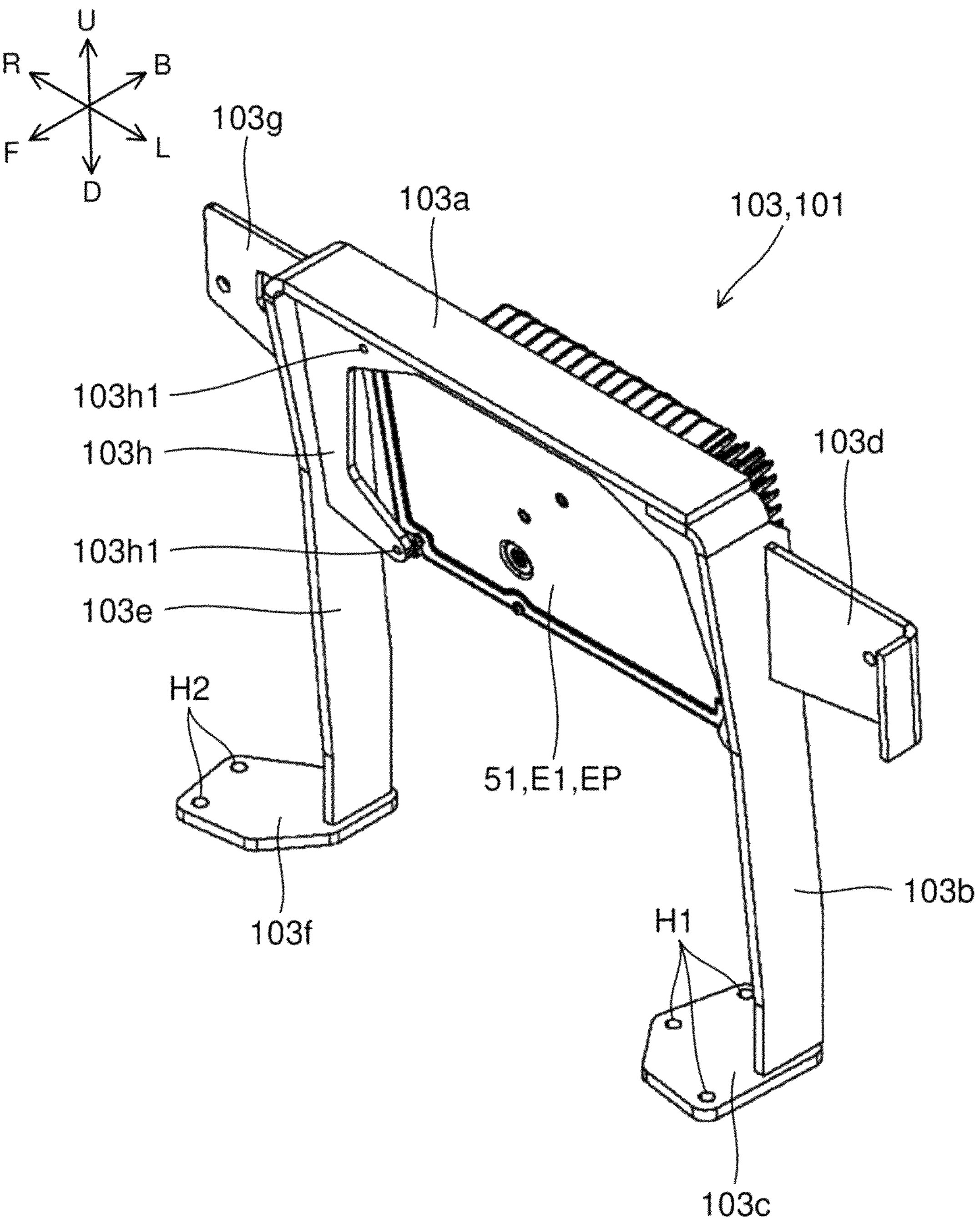
FIG. 5 is a perspective view from the front left illustrating the structure of a rear hood support part provided in the engine room.

The structure of the rear hood support part 103 will be described based on FIG. 5. FIG. 5 is a perspective view from front left illustrating the structure of the rear hood support part 103. The rear hood support part 103 has an upper plate part 103*a*, a left plate part 103*b*, a left bottom plate part 103*c*, a left stay 103*d*, a right plate part 103*e*, a right bottom plate part 103*f*, a right stay 103*g* and a reinforcing plate 103*h*.

The upper plate part 103*a* is located on the upper side of the rear hood support part 103 and is composed of a metallic plate-like member extending in the left-right direction. The upper plate part 103*a* is bonded to the upper wall part 45 (see FIG. 4) by welding. The left plate part 103*b* is coupled to the left end part of the upper plate part 103*a* and extends downward from the left end part. The lower end part of the left plate part 103*b* is coupled to the left bottom plate part 103*c*. The left bottom plate part 103*c* is composed of a plate-like member extending in the horizontal direction. A plurality of first through-holes H1 penetrating in the up-down direction are provided in the left bottom plate part 103*c*.

The left stay 103*d* is located on the left of the left plate part 103*b*. The left stay 103*d* is provided which protrudes from the left surface of the left plate part 103*b* toward the left. The tip part (the left end part) of the left stay 103*d* is bent forward. The left hood member 43L (see FIG. 1) is fixed to the left stay 103*d*.

The right plate part 103*e* is coupled to the right end part of the upper plate part 103*a* and extends downward from the right end part. The lower end part of the right plate part 103*e* is coupled to the right bottom plate part 103*f*. The right bottom plate part 103*f* is composed of a plate-like member extending in the horizontal direction. A plurality of second through-holes H2 penetrating in the up-down direction are provided in the right bottom plate part 103*f*.

The right stay 103*g* is located on the right of the right plate part 103*e*. The right stay 103*g* is provided which protrudes from the right surface of the right plate part 103*e* toward the right. The above right hood member is fixed to the right stay 103*g*.

The reinforcing plate 103*h* is provided below the upper plate part 103*a* and between the left plate part 103*b* and the right plate part 103*e* in the left-right direction. The reinforcing plate 103*h* is composed of an approximately inverted U-shaped plate-like member when viewed from the front. The structure of the reinforcing plate 103*h* is not limited to the above, and it may be structured with a simple flat plate. The reinforcing plate 103*h* is obliquely arranged along one direction. The above one direction refers to a direction that its upper side inclines forward against the up-down direction. The reinforcing plate 103*h* is bonded to the upper plate part 103*a*, the left plate part 103*b* and the right plate part 103*e* by welding. Rigidity of the rear hood support part 103 (rigidity in the left-right direction, especially) is improved by the reinforcing plate 103*h*.

A plurality of fixing holes 103*h*1 are provided in the reinforcing plate 103*h*. The fixing holes 103*h*1 penetrate in a direction that its front side inclines downward against the front-back direction. The first electrical device E1 (the charger 51) is arranged in a rear surface (in a surface facing obliquely upward) of the reinforcing plate 103*h* (see also FIG. 4). The first electrical device E1 is fixed to the fixing holes 103*h*1 by fastening members such as bolts. Thus, the first electrical device E1 is attached to the hood support part 101 (the rear hood support part 103, in particular).

As shown in FIG. 4, bolts B1 are respectively inserted into the first through-holes H1 and the second through holes H2 (see FIG. 5 for both of them) of the rear hood support part 103 to threadedly engage with thread parts (not shown) of the body frame 41. In this way, the rear hood support part 103 is fixed to the body frame 41. In particular, the left plate part 103*b* and the right plate part 103*e* of the rear hood support part 103 are vertically provided with respect to the body frame 41. Meanwhile, threadedly engaging described above refers to meshing and coupling a member having a male thread and a member having a female thread.

As described above, the hood support part 101 has members vertically provided with respect to the body frame 41 (the vertical plate 102*a* of the front hood support part 102, the left plate part 103*b* and the right plate part 103*e* of the rear hood support part 103). Consequently, it can be said that the hood support part 101 is vertically provided in the body frame 41.

Meanwhile, the fourth electrical device E4 (the DC-DC converter 55) is also fixed to the left stay 103*d* of the rear hood support part 103, in addition to the left hood member 43L. In particular, the fourth electrical device E4 is arranged forward of the left stay 103*d*. A support bracket 105 is attached to the rear surface part of the fourth electrical device E4. The support bracket 105 is composed of a metallic plate-like member extending in the up-down direction and is coupled to the tip part (the left end part) of the left stay 103*d*. Consequently, the fourth electrical device E4 is attached to the hood support part 101 (the left stay 103*d* of the rear hood support part 103, in particular) via the support bracket 105.

Figure 6:
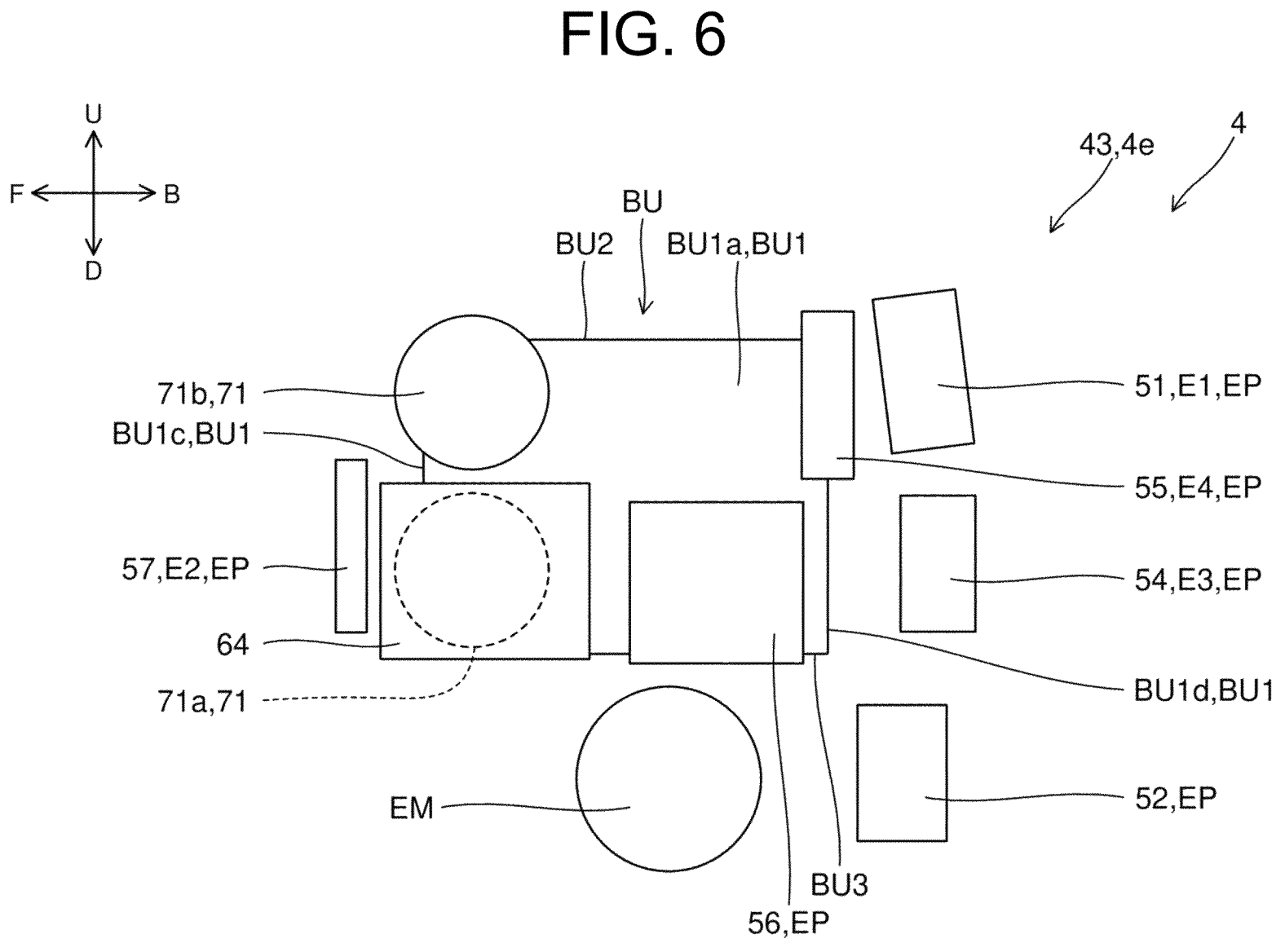
Figure 7:
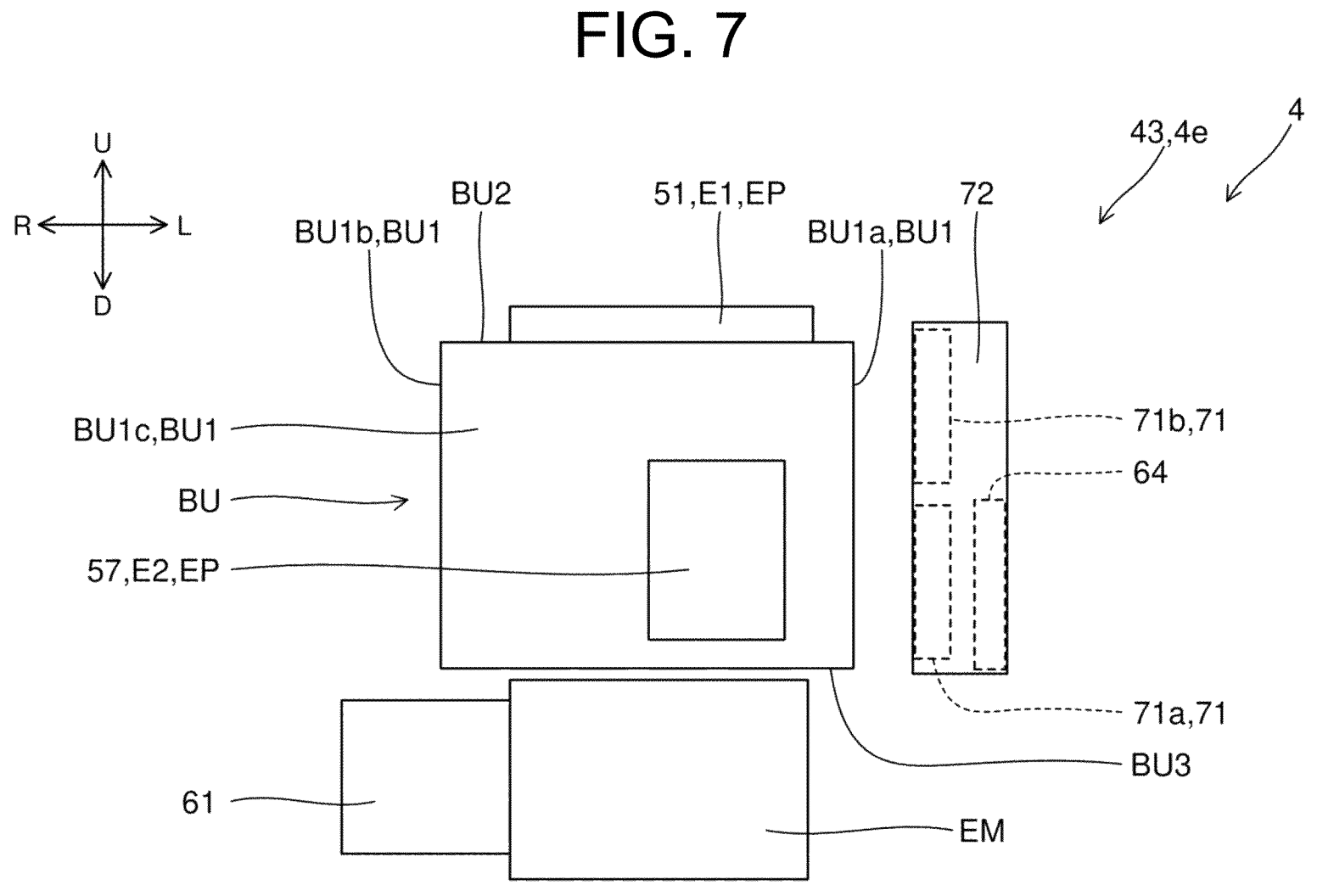

Next, in the internal structure of the engine room 43, the arrangement of devices (the battery unit BU, the electric motor EM, the electrical parts EP and the like) will be specifically explained based on FIG. 6 and FIG. 7. FIG. 6 and FIG. 7 are a left side view and a front view illustrating the arrangement of devices in the engine room 43. Although respective devices arranged in the engine room 43 are supported on the body frame 41 via support members such as stays (see FIG. 3 and FIG. 4), illustrations of support members are omitted in FIG. 6 and FIG. 7 for the purpose of clarifying positions of arranging respective devices. In addition, in FIG. 6, an illustration of a duct part 72 shown in FIG. 7 and described later is omitted for the sake of convenience.

As shown in FIG. 6, the first electrical device E1 (the charger 51) is arranged on the rear side of the engine room 43. As described above, the first electrical device E1 is attached to the reinforcing plate 103*h* of the rear hood support part 103 (see FIG. 5). Since the reinforcing plate 103*h* inclines along the above one direction (a direction that its front side inclines forward against the up-down direction), the first electrical device E1 is also obliquely arranged along the one direction.

The battery unit BU is arranged forward of the first electrical device E1. That is to say, the first electrical device E1 is located on one side (at the rear) in the front-back direction with respect to the battery unit BU. The battery unit BU has a rectangular box-like profile (see also FIG. 7). The battery unit BU has a side surface BU1, an upper surface BU2 and an undersurface BU3. The side surface BU1 includes a left surface BU1*a*, a right surface BU1*b* (see FIG. 7), a front surface BU1*c* and a rear surface BU1*d*. In particular, the first electrical device E1 is arranged in an opposing position to the rear surface BU1*d*. Consequently, the first electrical device E1 faces the side surface BU1 (the rear surface BU1*d*, in particular) of the battery unit BU.

According to the above structure, the height of the body is reduced while the height of the battery unit BU can be increased (under a certain area of arranging the battery unit BU), in comparison with the structure that the first electrical device E1 (the charger 51 in this embodiment) is arranged with the battery unit BU one on top of the other in the up-down direction, for example. Thus, while an increase in the height of the body is suppressed, the battery capacity can be increased.

In addition, as described above, because the first electrical device E1 is attached to the hood support part 101, the necessity for preparing an attachment member different from the hood support part 101 (a dedicated attachment member for attaching the first electrical device E1) is eliminated. This enables the first electrical device E1 to be attached with the small number of parts. Therefore, spaces to arrange the battery unit BU can be enlarged by spaces for the small number of parts. Also in this regard, the installation of the large (large-capacity) battery unit BU is allowed.

The hood support part 101 is provided in the body frame 41, i.e., in a member different from the battery unit BU, and the first electrical device E1 is attached to this hood support part 101. Because of this, despite such a layout that the first electrical device E1 is arranged opposite to the side surface BU1 (the rear surface BU1*d* in this embodiment) of the battery unit BU, stress resulting from the first electrical device E1 (gravity of the first electrical device E1 or tensile stress by the gravity, for example) may not act on the battery unit BU. As a result, the risk of damaging the battery unit BU due to the outside stress can be reduced, and the durability of the battery unit BU can be ensured. According to the above, while the durability of the battery unit BU is ensured, an increase in the height of the body is suppressed, and the installation of the large battery unit BU is allowed so that the battery capacity can be increased.

Especially, from the viewpoint of spaces to arrange the battery unit BU being expanded in the width direction (the left-right direction) of the body, it is desired that the first electrical device E1 is arranged on one side (at the rear in this embodiment) in the front-back direction with respect to the battery unit BU, as in this embodiment.

In this embodiment, as shown in FIG. 6, the second electrical device E2 (the system controller 57) is arranged opposite to the first electrical device E1 with respect to the battery unit BU (in other words, in a further front position than the battery unit BU).

With this arrangement, in spite of the structure that the electrical parts EP include the second electrical device E2 in addition to the first electrical device E1, the height of the body is reduced while the high height (large in the up-down direction) battery unit BU is provided. Moreover, as described above, because the second electrical device E2 is attached to the hood support part 101 (see FIG. 3), the necessity for preparing an attachment member different from the hood support part 101 (a dedicated attachment member for attaching the second electrical device E2) is eliminated. This reduces the number of parts in the attachment of the second electrical device E2. Therefore, despite the structure that the electrical parts EP include the second electrical device E2, from the viewpoint of an increase in the height of the body being suppressed and the battery capacity being increased with the small number of parts, the following structure is desired. Namely, it is desired that the second electrical device E2 is arranged on the other side (the front in this embodiment) in the front-back direction with respect to the battery unit BU and is attached to the hood support part 101, as in this embodiment.

The electric motor EM is arranged in an opposing position to the undersurface BU3 of the battery unit BU. Thus, the electric motor EM is located below the battery unit BU. That is to say, the electric motor EM is located closer to the bottom part 4*a* (see FIG. 1) of the body than the battery unit BU. Further, the inverter 52 is arranged rearward of the electric motor EM and in an opposing position to the electric motor EM. In other words, the inverter 52 is located on one side (at the rear) in the front-back direction with respect to the electric motor EM. Also, the inverter 52 faces the electric motor EM.

Figure 8:
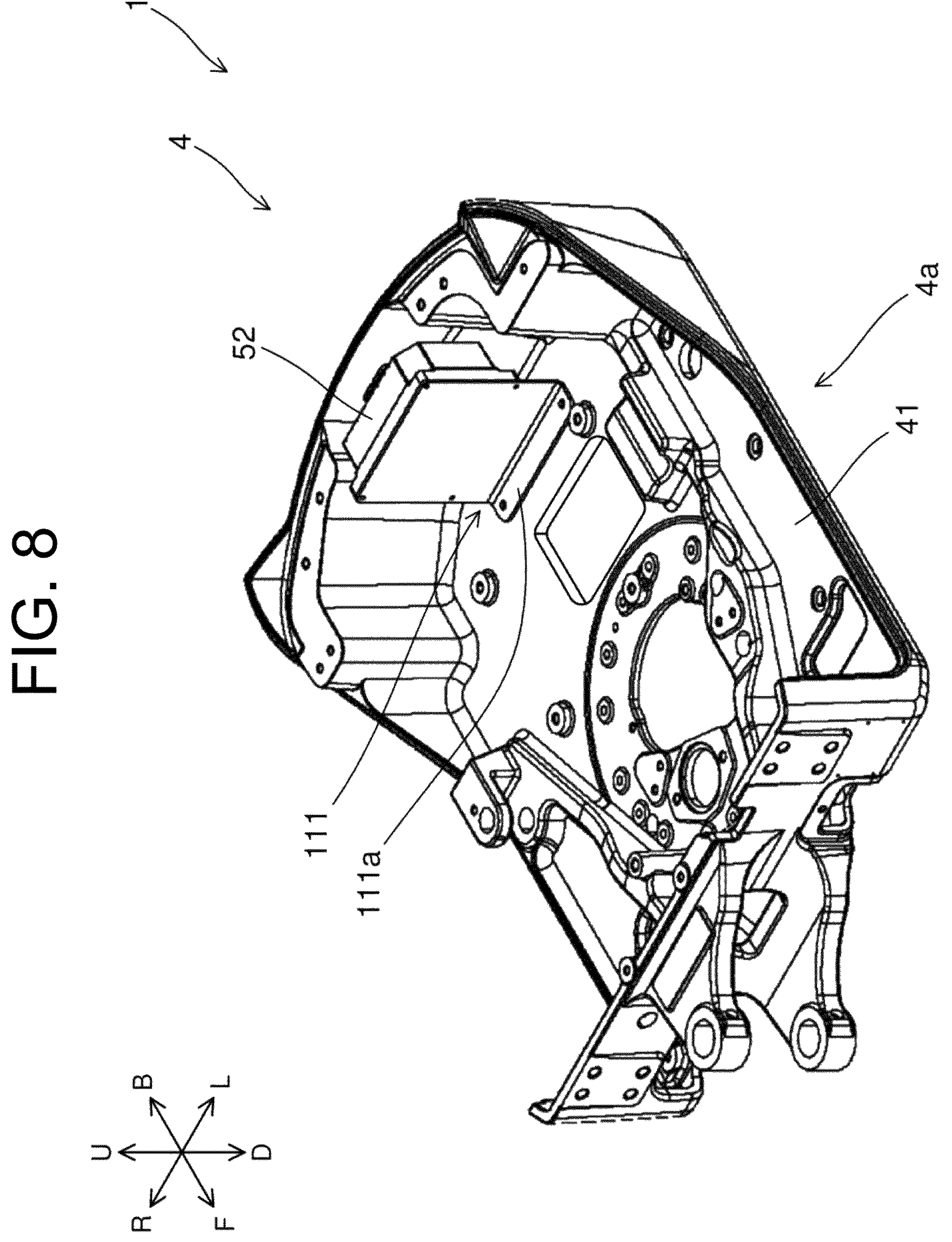
FIG. 8 is a perspective view from the front left illustrating a structure for attaching an inverter which is arranged in the engine room.

Meanwhile, the inverter 52 is supported by the body frame 41 (see FIG. 4). More details are as follows. FIG. 8 is a perspective view from the front left illustrating a structure of attaching the inverter 52. A first attachment bracket 111 is provided forward of the inverter 52. The first attachment bracket 111 is composed of a metallic plate-like member which extends in the up-down direction and whose lower end part 111*a* is bent forward. The lower end part 111*a* of the first attachment bracket 111 is coupled to the body frame 41. The inverter 52 is fixed to the rear surface part of the first attachment bracket 111 by fastening members such as bolts. Therefore, the inverter 52 is attached to the body frame 41 by the first attachment bracket 111. In a word, the inverter 52 is supported by the body frame 41 via the first attachment bracket 111.

With this structure (the structure of arranging the electric motor EM and the inverter 52), the size of the body in the horizontal direction is easily reduced in comparison with such a layout that the electric motor EM and the inverter 52 are horizontally arranged with the battery unit BU side by side, for example. In addition, when the inverter 52 is attached to the body frame 41, the inverter 52 is located in the bottom part 4*a* of the body (see FIG. 8). As described above, the electric motor EM is located closer to the bottom part 4*a* of the body (than the battery unit BU). To that end, with this structure (the structure of the inverter 52 being attached to the body frame 41), the inverter 52 is easily arranged opposite to the electric motor EM.

In spite of the structure that the electrical parts EP include the inverter 52, it is desired that the structure suitable for the small (small-revolving) hydraulic excavator 1 is easily realized. From this viewpoint, it is desired that the electric motor EM is arranged below the battery unit BU, and the inverter 52 is attached, opposite to the electric motor EM, to the body frame 41, as in this embodiment.

When the inverter 52 is arranged on the further rear side than the electric motor EM, the inverter 52 is easily arranged on the rear side of the engine room 43. This facilitates access to the inverter 52 from the rear of the body. Accordingly, from the viewpoint of the shortened operation time (improved work efficiency) in maintenance operations of the inverter 52, it is desired that the inverter 52 is arranged on one side in the front-back direction (i.e., on the same side as that of the first electrical device E1 being arranged with respect to the battery unit BU in the front-back direction) with respect to the electric motor EM, as in this embodiment.

As shown in FIG. 6, the third electrical device E3 (the junction box 54) is arranged below the first electrical device E1 and above the inverter 52. Therefore, the first electrical device E1, the third electrical device E3, and the inverter 52 are located in the order from top.

With this arrangement, empty spaces between the first electrical device E1 and the inverter 52 are effectively utilized as spaces to arrange the third electrical device E3. Despite the structure that the electrical parts EP include the third electrical device E3 other than the first electrical device E1 and the inverter 52, efficiently (compactly) arranging the third electrical device E3 in the engine room 43 is desired. From this viewpoint, it is desired that the third electrical device E3 is located between the first electrical device E1 and inverter 52, as in this embodiment.

The fourth electrical device E4 (the DC-DC converter 55) and the low-voltage battery 56 are arranged on the further left side than the battery unit BU. The low-voltage battery 56 is located below the fourth electrical device E4 and in a forward displaced manner with respect to the fourth electrical device E4. Namely, the fourth electrical device E4 is located above the low-voltage battery 56.

With this arrangement, the size of the body in the front-back direction is easily reduced in comparison with such a structure that the fourth electrical device E4 is arranged with the battery unit BU side by side in the front-back direction, for example. In addition, as described above, because the fourth electrical device E4 is attached to the hood support part 101 (see FIG. 4), the necessity for preparing an attachment member different from the hood support part 101 (a dedicated attachment member for attaching the fourth electrical device E4) is eliminated. This reduces the number of parts in the attachment of the fourth electrical device E4. Therefore, when the electrical parts EP include the fourth electrical device E4, from the viewpoint of the structure suitable for the small (small-revolving) hydraulic excavator 1 being easily realized with the small number of parts, the following structure is desired. Namely, it is desired that the fourth electrical device E4 is arranged on one side (the left in this embodiment) in the width direction of the body with respect to the battery unit BU and is attached to the hood support part 101, as in this embodiment.

When the fourth electrical device E4 and the low-voltage battery 56 are collectively arranged on the further left side than the battery unit BU, simultaneous access to the fourth electrical device E4 and the low-voltage battery 56 from the left is facilitated. This shortens operation time in a case where the fourth electrical device E4 and the low-voltage battery 56 are simultaneously maintained. In addition, in the electrical parts EP, when the low-voltage battery 56 having relatively heavy weight is arranged in the lowest possible position, the center of gravity of the body is decreased. Accordingly, from the viewpoint of improved work efficiency in the maintenance operations and the stabilized body, it is desired that the low-voltage battery 56 is arranged on the one side with respect to the battery unit BU, and the fourth electrical device E4 is arranged above the low-voltage battery 56, as in this embodiment.

The fan 71 is arranged in the further front position than the fourth electrical device E4 and the low-voltage battery 56.

The fan 71 is composed of an electric fan and is driven by low voltage power which is supplied from the DC-DC converter 55 and the low-voltage battery 56. When the fan 71 is driven, air (outside air) is sucked (taken) in the engine room 43. This creates an air (wind) flow in the engine room 43. In more detail, a first opening part (not shown) is provided in the exterior part 4*c* (see FIG. 1, the body frame 41, for example) of the upper structure 4. Moreover, in the left hood member 43L which is included in the exterior part 4*c*, a second opening part 43L2 is provided (see FIG. 1).

Air described above flows from the first opening part into the engine room 43 and is evacuated from the second opening part 43L2.

As shown in FIG. 7, the fan 71 includes a first fan 71*a* and a second fan 71*b* which are arranged one on top of the other in the up-down direction. The first fan 71*a* is located below the second fan 71*b*. The heat exchanger 64 is arranged at the left of the first fan 71*a* and in a position facing the first fan 71*a*. The heat exchanger 64 and the fan 71 (the first fan 71*a*, the second fan 71*b*) are arranged in the duct part 72 (see also FIG. 3 and FIG. 4). The duct part 72 is composed of a hollow metallic member which extends in the left-right direction. The left part of the duct part 72 opens entirely. The right part of the duct part 72 opens partly. The duct part 72 structures a flow path of air flowing through the engine room 43. The duct part 72 is arranged in the further left position than the battery unit BU and the electric motor EM.

Meanwhile, the hydraulic pump 61 is arranged on the right of the electric motor EM.

Figure 9:
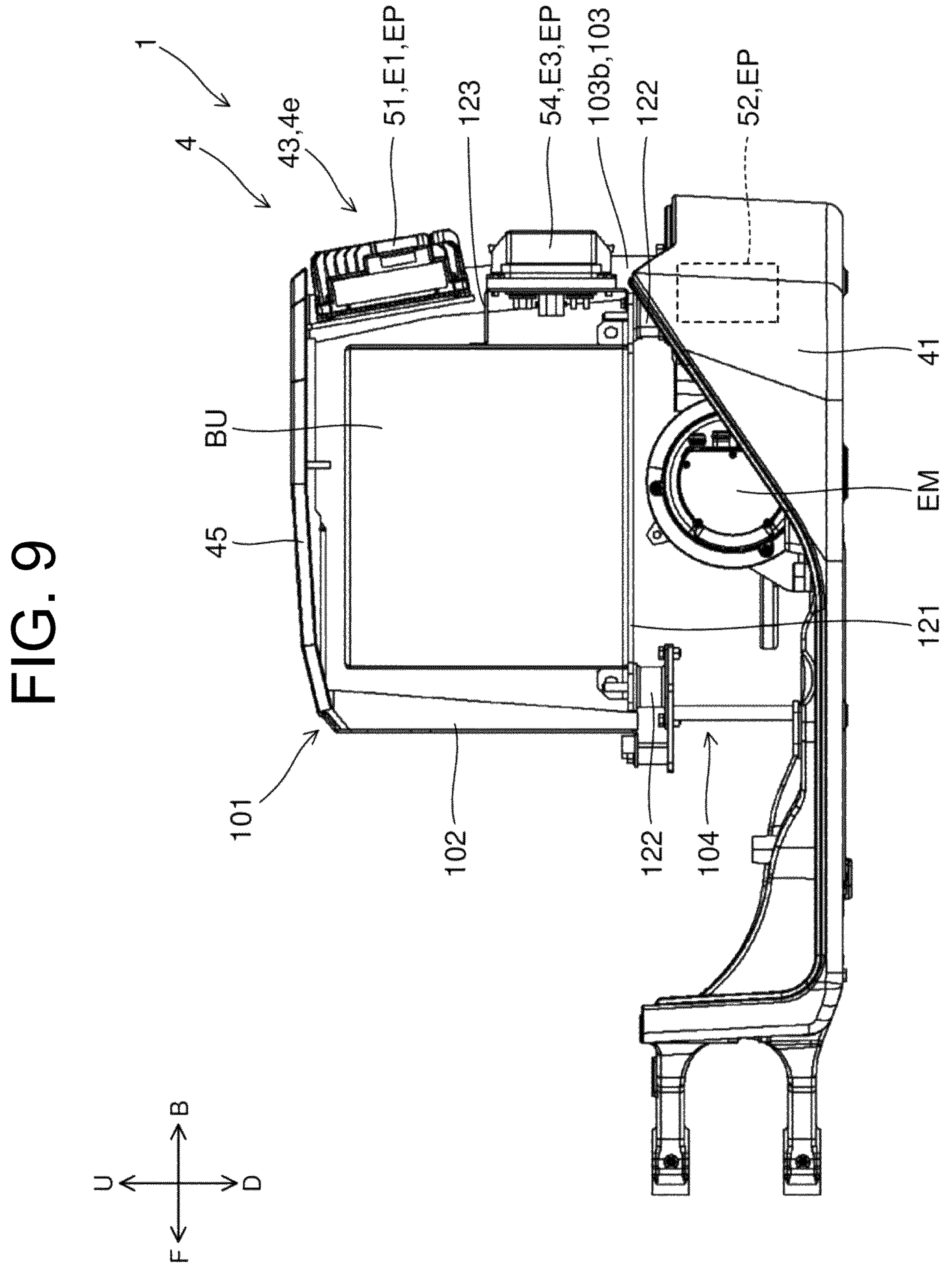
FIG. 9 is a left side view illustrating a structure for supporting a battery unit which is arranged in the engine room.

Next, a structure of supporting the battery unit BU will be explained based on FIG. 9. FIG. 9 is a left side view illustrating the structure of supporting the battery unit BU. In FIG. 9, illustrations of the fourth electrical device E4, the low-voltage battery 56, the left plate part 103*b* of the rear hood support part 103 and the like are omitted for convenience.

A battery support plate 121 is provided in the engine room 43. That is to say, the hydraulic excavator 1 comprises the battery support plate 121 in the inner part 4*e* of the upper structure 4. The battery support plate 121 is composed of a metallic plate-like member extending in the horizontal direction. The battery support plate 121 is arranged below the first electrical device E1 (the charger 51). Also, the battery support plate 121 is arranged above the inverter 52.

The front side of the battery support plate 121 is supported by the support column part 104 via an anti-vibration member 122. The anti-vibration member 122 is structured with an elastic body (rubber, for example). The support column part 104 is coupled to the body frame 41, as described above (see FIG. 3). The rear side of the battery support plate 121 is supported by the body frame 41 via the anti-vibration member 122.

The battery unit BU is installed on the battery support plate 121. In particular, the battery unit BU is arranged with the undersurface BU3 (see FIG. 6) abutting on an upper surface 121U (see FIG. 4) of the battery support plate 121. The battery unit BU is fixed to the upper surface 121U of the battery support plate 121 by fastening members such as bolts. Thus, the support plate 121 supports the battery unit BU from underneath.

The third electrical device E3 (the junction box 54) is attached to the rear side of the battery support plate 121 (the upper surface 121U, especially) via a second attachment bracket 123. In more detail, the second attachment bracket

123 is provided forward of the third electrical device E3. The second attachment bracket 123 is composed of a metallic plate-like member which extends in the up-down direction and whose respective upper and lower end parts are bent forward. The lower end part of the second attachment bracket 123 is fixed to the battery support plate 121 by fastening members such as bolts. The battery unit BU is located forward of the second attachment bracket 123. The upper end part of the second attachment bracket 123 is coupled to the rear surface BU1*d* (see FIG. 6) of the battery unit BU. The third electrical device E3 is fixed to the rear surface part of the second attachment bracket 123 by fastening members such as bolts.

With this arrangement, the battery support plate 121 is effectively utilized as a member of attaching the third electrical device E3. This eliminates the necessity for preparing an attachment member different from the battery support plate 121 (a dedicated attachment member for attaching the third electrical device E3) for attaching the third electrical device E3, which reduces the number of parts. Further, the battery support plate 121 is located between the first electrical device E1 and the inverter 52 in the up-down direction. Because of this, when the third electrical device E3 is attached to the battery support plate 121, the third electrical device E3 is located between the first electrical device E1 and the inverter 52. Therefore, from the viewpoint of the third electrical device E3 being reliably arranged between the first electrical device E1 and the inverter 52 with the small number of parts to efficiently arrange the third electrical device E3 in the engine room 43, the following structure is desired. Namely, in the structure that the hydraulic excavator 1 comprises the battery support plate 121 supporting the battery unit BU from underneath, it is desired that the third electrical device E3 is attached to the battery support plate 121, as in this embodiment.

[4. Supplementary Description]

In this embodiment, the structure that the battery unit BU has a rectangular box-like profile has been described; however, the profile of the battery unit BU is not limited to the above. The battery unit BU may be structured as large as possible, and may also be structured by partly protruding its profile, for example.

In this embodiment, the structure that the first electrical device E1 (the charger 51) faces the rear surface BU1*d* of the battery unit BU has been explained; however, as long as the first electrical device E1 faces the side surface BU1 of the battery unit BU, the structure is not limited to the rear surface BU1*d*. For example, the first electrical device E1 may also face the front surface BU1*c* of the battery unit BU. Moreover, the first electrical device E1 may also face the left surface BU1*a* of the battery unit BU. Further, the first electrical device E1 may also face the right surface BU1*b* of the battery unit BU.

Meanwhile, the above "facing" is not limited to perfectly and completely facing each other (i.e., rightly opposing). For example, in this embodiment, the first electrical device E1 is obliquely arranged along the above one direction (a direction that its upper side inclines forward against the up-down direction). To this end, the first electrical device E1 also inclines against the side surface BU1 (the rear surface BU1*d* in this embodiment) of the battery unit BU (see FIG. 6). Even with this structure, effects of this embodiment can be obtained (due to the fact that the first electrical device E1 is attached to the hood support part 101) as long as the first electrical device E1 opposes (faces) the side surface BU1.

In this embodiment, the hydraulic excavator 1 that is a construction machine has been described as an example of an electric work machine; however, the electric work machine is not limited to the hydraulic excavator 1 and may be a construction machine such as a wheel loader. In addition, the electric work machine may be an agricultural machine such as a combine harvester or a tractor.

[5. Supplementary Notes]

The hydraulic excavator 1 described in this embodiment can also be expressed as an electric work machine as described in the following supplementary notes.

An electric work machine of supplementary note (1)

comprises: a body frame located in a bottom part of a body;

a hood support part vertically provided in the body frame;

a battery unit for charging power;

an electric motor driven by the power which is supplied from the battery unit; and electrical parts electrically connected to the battery unit, wherein the electrical parts include a first electrical device which is attached, opposite to a side surface of the battery unit, to the hood support part.

According to an electric work machine of supplementary note (2), in the electric work machine according to supplementary note (1), the first electrical device is arranged on one side in a front-back direction of the body with respect to the battery unit.

According to an electric work machine of supplementary note (3), in the electric work machine according to supplementary note (2), the electrical parts include a second electrical device which is attached to the hood support part on the other side in the front-back direction with respect to the battery unit.

According to an electric work machine of supplementary note (4), in the electric work machine according to supplementary note (2) or (3), the electric motor is arranged below the battery unit, and the electrical parts include an inverter which is attached, opposite to the electric motor, to the body frame.

According to an electric work machine of supplementary note (5), in the electric work machine according to supplementary note (4), the inverter is arranged on the one side in the front-back direction with respect to the electric motor.

According to an electric work machine of supplementary note (6), in the electric work machine according to supplementary note (5), the electrical parts include a third electrical device located between the first electrical device and the inverter.

An electric work machine of supplementary note (7), in the electric work machine according to supplementary note (6), comprises a battery support plate supporting the battery unit from underneath, wherein the third electrical device is attached to the battery support plate.

According to an electric work machine of supplementary note (8), in the electric work machine according to any one of supplementary notes (1) to (7), the electrical parts include a fourth electrical device which is attached to the hood support part on one side in a width direction of the body with respect to the battery unit.

According to an electric work machine of supplementary note (9), in the electric work machine according to supplementary note (8), the electrical parts include a low-voltage battery which outputs a voltage lower than that of the battery unit, the low-voltage battery is arranged on the one side with respect to the battery unit, and the fourth electrical device is arranged above the low-voltage battery.

The embodiment of the present invention has been described above; however, the scope of the present invention is not limited to this and may be expanded or modified without departing from the spirit of the invention.

INDUSTRIAL APPLICABILITY

The present invention is available for an electric work machine such as a construction machine and an agricultural machine, for example.

REFERENCE SIGNS LIST

1 hydraulic excavator (electric work machine)
4 upper structure (body)
**4*a*** bottom part
41 body frame
52 inverter (electrical parts)
56 low-voltage battery (electrical parts)
101 hood support part
121 battery support plate
BU battery unit
BU1 side surface
E1 first electrical device (electrical parts)
E2 second electrical device (electrical parts)
E3 third electrical device (electrical parts)
E4 fourth electrical device (electrical parts)
EM electric motor
EP electrical parts

The invention claimed is:

1. An electric work machine comprising: a body frame located in a bottom part of a body;

a hood support part vertically provided in the body frame;

a battery unit for charging power;

an electric motor driven by the power which is supplied from the battery unit; and electrical parts electrically connected to the battery unit, wherein the electrical parts include a first electrical device which is attached, opposite to a side surface of the battery unit, to the hood support part.

2. The electric work machine according to claim 1, wherein the first electrical device is arranged on one side in a front-back direction of the body with respect to the battery unit.

3. The electric work machine according to claim 2, wherein the electrical parts include a second electrical device which is attached to the hood support part on the other side in the front-back direction with respect to the battery unit.

4. The electric work machine according to claim 2, wherein the electric motor is arranged below the battery unit, and the electrical parts include an inverter which is attached, opposite to the electric motor, to the body frame.

5. The electric work machine according to claim 4, wherein the inverter is arranged on the one side in the front-back direction with respect to the electric motor.

6. The electric work machine according to claim 5, wherein the electrical parts include a third electrical device located between the first electrical device and the inverter.

7. The electric work machine according to claim 6, comprising a battery support plate supporting the battery unit from underneath, wherein the third electrical device is attached to the battery support plate.

8. The electric work machine according to claim 1, wherein the electrical parts include a fourth electrical device which is attached to the hood support part on one side in a width direction of the body with respect to the battery unit.

9. The electric work machine according to claim 8, wherein the electrical parts include a low-voltage battery which outputs a voltage lower than that of the battery unit, and the low-voltage battery is arranged on the one side with respect to the battery unit, and the fourth electrical device is arranged above the low-voltage battery.

* * * * *